(12) United States Patent
Kolachina et al.

(10) Patent No.: US 9,164,961 B2
(45) Date of Patent: Oct. 20, 2015

(54) METHODS AND SYSTEMS FOR PREDICTING LEARNING CURVE FOR STATISTICAL MACHINE TRANSLATION SYSTEM

(71) Applicant: Xerox Corporation, Norwalk, CT (US)

(72) Inventors: Prasanth Kolachina, Andhra Pradesh (IN); Nicola Cancedda, Grenoble (FR); Marc Dymetman, Grenoble (FR); Sriram Venkatapathy, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 463 days.

(21) Appl. No.: 13/689,878

(22) Filed: Nov. 30, 2012

(65) Prior Publication Data
US 2014/0156565 A1 Jun. 5, 2014

(51) Int. Cl.
*G06F 17/28* (2006.01)
*G06F 17/18* (2006.01)

(52) U.S. Cl.
CPC ............ *G06F 17/18* (2013.01); *G06F 17/2854* (2013.01); *G06F 17/2818* (2013.01)

(58) Field of Classification Search
CPC . G06F 17/18; G06F 17/2818; G06F 17/2854; G06N 99/00
See application file for complete search history.

(56) References Cited

PUBLICATIONS

Predicting sample size required for classification performance, by Figueroa et al., published Feb. 2012.*
Measuring Confidence Intervals for MT Evaluation Metrics, by Ying, published 2004.*
George Foster, Roland Kuhn. 2009. Stabilizing minimum error rate training. In Proceedings of the Fourth Workshop on Statistical Machine Translation (EACL2009), Athens, Greece.
P. Koehn et al. 2003. Statistical phrase-based translation. In Proceedings of the Human Language Technology Conference 2003 (HLTNAACL 2003), Edmonton, Canada, May 2003.
"Prediction of Learning Curves in Machine Translation", Kolachina et al, pp. 1-9.
A. Birch, M. Osborne, and P. Koehn. 2008. Predicting success in machine translation. In Proceedings of the Conference on Empirical Methods in Natural Language Processing, pp. 745-754. Association for Computational Linguistics.
Jonathan H. Clark, Chris Dyer, Alon Lavie, and Noah A.Smith. 2011. Better hypothesis testing for statistical machine translation: Controlling for optimizer instability. Proceedings of the 49th Annual Meeting of the Association for Computational Linguistics. shortpapers, pp. 176-181.
George Foster and Roland Kuhn. 2009. Stabilizing minimumerror rate training. In Proceedings of the Fourth Workshop on Statistical Machine Translation (EACL 2009), Athens, Greece. pp. 242-249.
B. Gu, F. Hu, and H. Liu. 2001. Modelling classification performance for large data sets. Advances in Web-Age Information Management, pp. 317-328.
P. Koehn, F. Och, and D. Marcu. 2003. Statisticalphrase-based translation. In Proceedings of the Human Language Technology Conference 2003 (HLTNAACL 2003), Edmonton, Canada, pp. 48-54.

(Continued)

*Primary Examiner* — Jeffrey A Gaffin
*Assistant Examiner* — Thomas Fink

(57) ABSTRACT

The disclosed embodiments relate to a system and method for predicting the learning curve of an SMT system. A set of anchor points are selected. The set of anchor points correspond to a size of a corpus. Thereafter, a gold curve or a benchmark curve is fitted based on the set of anchor points to determine the BLEU score. Based on the BLEU score and a set of parameters associated with the first set of anchor points, a confidence score is computed.

24 Claims, 7 Drawing Sheets

(56) References Cited

PUBLICATIONS

P. Koehn, H. Hoang, A. Birch, C. Callison-Burch, M. Federico, N. Bertoldi, B. Cowan, W. Shen, C. Moran, R. Zens, et al. 2007. Moses: Open source toolkit for statistical machine Translation Proceedings of the ACL 2007 Demo and Poster Sessions, pp. 177-180, Prague, Jun. 2007.

J. More. 1978. The levenberg-marquardt algorithm: implementation and theory. Numerical analysis, pp. 105-116.

K. Papineni, S. Roukos, T. Ward, and W.J. Zhu. 2002. Bleu: a method for automatic evaluation of machine translation. In Proceedings of the 40th annual meeting of the Association for Computational Linguistics (ACL), Philadelphia, Jul. 2002, pp. 311-318.

C. Perlich, F. Provost, and J.S. Simonoff. 2003. Tree induction vs. logistic regression: A learning-curve analysis. The Journal of Machine Learning Research, 4:211-255.

S. Petrov, D. Das, and R. McDonald. 2011. A universal part-of-speech tagset. Arxiv preprint ArXiv:1104.2086.

R. Tibshirani. 1996. Regression shrinkage and selection via the lasso. J. Royal Statistical Soc B, 58(1):267-288.

\* cited by examiner

METHODS AND SYSTEMS FOR PREDICTING LEARNING CURVE FOR STATISTICAL MACHINE TRANSLATION SYSTEM

TECHNICAL FIELD

The presently disclosed embodiments are related, in general, to a statistical machine translation (SMT) system. More particularly, the presently disclosed embodiments are related to systems and methods for predicting a learning curve for the SMT system.

BACKGROUND

Statistical Machine Translation (SMT) system corresponds to a machine translation system that enables a user to translate linguistic sentences from a first language to a second language. The SMT system is generally trained using a sample corpus prior to using the SMT system for translating the sentences. The sample corpus may include a plurality of sentences in a first language and corresponding translated sentences in a second language. Size of the sample corpus (i.e. number of sentences in the sample corpus) may be deterministic of an efficiency of the SMT system.

SUMMARY

According to embodiments illustrated herein, there is provided a computer-implemented method of estimating a learning curve indicative of training the statistical machine translation (SMT). The computer-implemented method includes selecting a first set of anchor points. Each of the first set of anchor points corresponds to a different number of monolingual segments. The first set of anchor points is selectable by a user. Further, the computer-implemented method includes computing a weight vector for each of the first set of anchor points based, at least in part, on a first set of parameters associated with each of the first set of anchor points. Finally, the computer-implemented method includes computing a first confidence score for each of the first set of anchor points based on the weight vector.

According to embodiments illustrated herein, there is provided a computer-implemented method of estimating a learning curve indicative of training a statistical machine translation (SMT). The computer-implemented method includes selecting a second set of anchor points. Each of the second set of anchor points corresponds to a different number of bi-lingual segments. The second set of anchor points is selectable by a user. Further, the computer-implemented method includes fitting a second curve based on each of the second set of anchor points. Second set of parameters associated with the second curve are estimated to obtain the learning curve. The second set of parameters includes a value at an origin, a slope at the origin, and an asymptotic value.

According to embodiments illustrated herein, there is provided a computer-implemented method of estimating a learning curve associated with training of a statistical machine translation (SMT). The computer-implemented method includes selecting a first set of anchor points. Each of the first set of anchor points corresponds to a different number of monolingual segments. The first set of anchor points is selectable by a user. A second set of anchor points is selected. Each of the second set of anchor points corresponds to a different number of bi-lingual segments. The second set of anchor points is selectable by a user. A second curve is fitted based on each of the second set of anchor points. Thereafter, the second curve is extended to the first set of anchor points. A second confidence score is computed for each of the first set of anchor points based, at least in part, on one or more parameters associated with the second curve. A weight vector is computed for each of the first set of anchor points based on a first set of parameters associated with each of the first set of anchor points. Finally, a first confidence score is computed for each of the first set of anchor points based on the weight vector.

According to embodiments illustrated herein, there is provided a system for determining a learning curve indicative of training an SMT. The system includes an anchor point selection module configured to select at least one of a first set of anchor points or a second set of anchor points. A curve-fitting module is configured to fit a second curve based on each of the second set of anchor points. Further, the system includes an estimation module configured to extrapolate the second curve to the first set of anchor points. A scoring module is configured to compute a second confidence score for each of the first set of anchor points based, at least in part, on one or more parameters associated with the second curve. Further, the scoring module is configured to compute a weight vector for each of the first set of anchor points based on a first set of parameters associated with each of the first set of anchor points. The curve-fitting module is configured to determine a second set of parameters associated with the learning curve based, at least in part, on the second confidence score and the weight vector.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
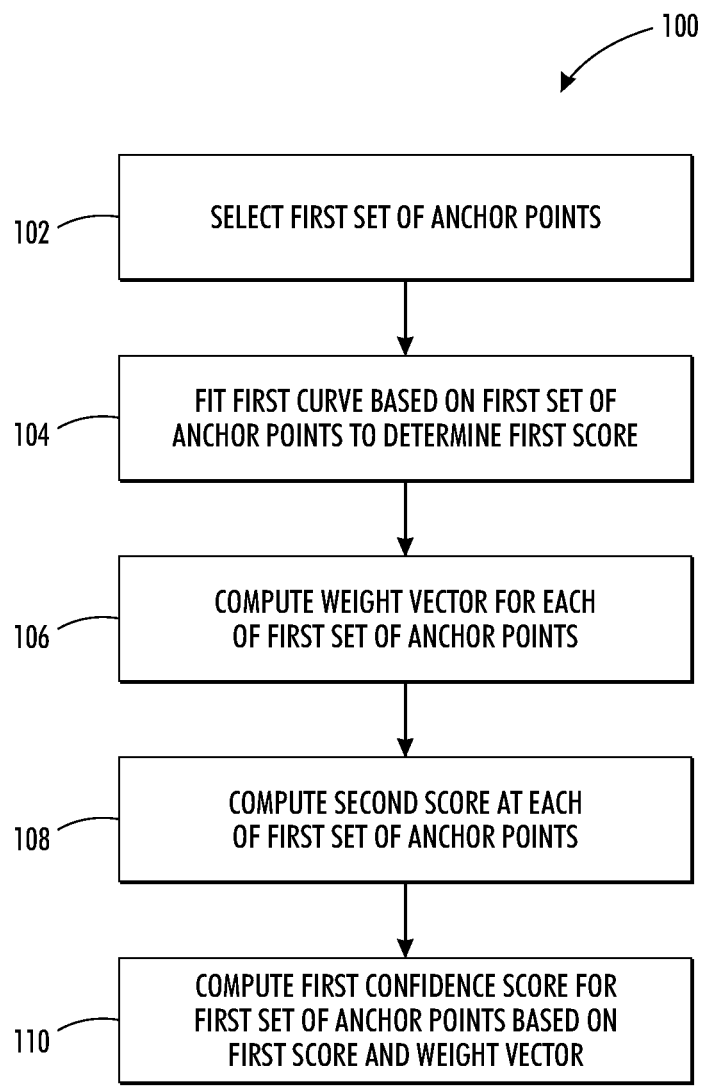
FIG. 1 is a flowchart illustrating a method of training a prediction model to estimate a learning curve of a statistical machine translation (SMT) system in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions

The following terms shall have, for the purposes of this application, the respective meanings set forth below.

A "corpus" refers to a collection of linguistic sentences in one or more languages. In an embodiment, the corpus includes a plurality of sentences in a first language and corresponding correct translated sentences in a second language. In an embodiment, the corpus is used for training an SMT system. Some examples of corpus include, but are not limited to, the American National corpus, the Bank of English, the Europarl corpus, etc. Various types of corpus include, but are not limited to, a monolingual corpus and a bi-lingual corpus.

A "Monolingual corpus" refers to a corpus that includes a plurality of linguistic sentences in one language only.

A "Bi-lingual corpus" refers to a corpus that includes linguistic sentences in one or more languages. In a bi-lingual corpus, sentences in a first language and corresponding translated sentences in a second language are structured for side-by-side comparison. In an embodiment, the bi-lingual corpus corresponds to a parallel corpus.

An "anchor point" refers to a corpus size (e.g., a predefined number of sentences in one or more languages) of a particular corpus. For example, the anchor point may have 10K monolingual/bi-lingual sentences.

A "weight vector" refers to a score assigned to an anchor point based on one or more parameters associated with a corpus corresponding to the anchor points. In an embodiment, the one or more parameters include, but are not limited to, length of sentences in the anchor point, lexical diversity in the anchor point, average length of tokens in the anchor point, and word order divergence in the anchor point. In an embodiment, the one or more parameters associated with the anchor points are mathematically evaluated to assign the weight vector to the anchor points.

"Length of sentences in the anchor point" refers to an average number of words in the sentences of the corpus corresponding to the anchor point.

"Lexical diversity in the anchor point" refers to different words present in the corpus corresponding to the anchor point.

A "corpus configuration" refers to combination of language pair and domain.

A "learning curve" refers to a graphical representation of a changing rate of learning for an SMT system. In an embodiment, the learning curve is plotted between a Bi-lingual Evaluation Understudy (BLEU) score and the size of a corpus (i.e., anchor points) used to train SMT system.

A "BLEU score" refers to a measure of quality of text translated by an SMT system. In an embodiment, the quality of the SMT system is a correspondence between a machine's output and a human output.

A "confidence score" refers to a measure of trust on an anchor point. In an embodiment, the confidence score is computed based on the weight vector assigned to the anchor point.

A "regression model" refers to a mathematical model that is used for predicting the value of one or more variables. In an embodiment, the regression model is utilized for predicting the weight vectors.

FIG. 1 is a flowchart 100 illustrating a method of training a prediction model to estimate a learning curve of an SMT system in accordance with at least one embodiment.

At step 102, a first set of anchor points is selected. In an embodiment, the first set of anchor points is randomly selected. In an alternate embodiment, a user selects the anchor points. In an embodiment, the first set of anchor points includes at least three anchor points. In an embodiment, each of the first set of anchor points corresponds to a monolingual corpus that includes a plurality of monolingual segments. Further, a bi-lingual corpus is selected in addition to the first set of anchor points. In an embodiment, the bi-lingual corpus has a predefined configuration and a plurality of test-sets. In an embodiment, the user selects the bi-lingual corpus. Further, the user selects the various configurations and the test sets to be used for training the SMT system. Following table illustrates some examples of the bi-lingual corpus:

TABLE 1

Examples of bi-lingual corpus

| Domain | Source Language | Target Language | # Test sets |
|---|---|---|---|
| Europarl | Fr, De, Es, En | En, Fr, De, Es | 4 |
| KFTT | Jp, En | En, Jp | 2 |
| EMEA | Da, De | En | 4 |
| News | Cz, En, Fr, De, Es | Cz, En, Fr, De, Es | 3 |

At step 104, a first curve is fitted through each of the first set of anchor points to determine a first score at each of the first set of anchor points. In an embodiment, the first curve corresponds to a gold curve or a benchmark curve. Hereinafter, the terms "first curve" and "gold curve" are interchangeably used. The gold curve is representative of an ideal learning curve of the SMT system. In an embodiment, the first score at an anchor point is indicative of an efficiency of the SMT system that has been trained using the corpus having a size equal to the number of segments defined by the anchor point. In an embodiment, the first score is the BLEU score. In an embodiment, the first score is determined using the Cartesian coordinate system. For example, the gold curve passes through the point $(x_i, y_i)$, where, $x_i$ corresponds to an anchor point and $y_i$ corresponds to the first score at the anchor point. In an embodiment, the equation of the gold curve fitted through the first set of anchor points is illustrated below:

$$y = c - ax^{-\alpha} \quad (1)$$

In an embodiment, the gold curve is obtained by training the SMT system using the bi-lingual corpus mentioned in table 1. In an embodiment, the SMT system is trained for different test sets and configurations associated with each of the bi-lingual corpora. A BLEU score is computed for each of the test-set and the configuration. In an embodiment, following equation is used for computing the BLEU score:

$$y_i = F(x_i; \theta) + \epsilon_i \quad (2)$$

$y_i$: BLEU score;
$x_i$: Number of bi-lingual segments in the dataset d;
$\epsilon_i$: Gaussian noise; and
$F(x_i; \theta)$: Regression model.

Thereafter, the BLEU score and the corresponding configuration is plotted using the family of curves mentioned below in Table 2:

TABLE 2

The family of curves and corresponding formula

| Curves | Formula |
| --- | --- |
| Exp3 | $y = c - e^{-ax+b}$ |
| Exp4 | $y = c - e^{-ax^\alpha + b}$ |
| ExpP3 | $y = c - e^{(x-b)^\alpha}$ |
| Pow3 | $y = c - ax^{-\alpha}$ |
| Pow4 | $y = c - (-ax + b)^{-\alpha}$ |
| ILog2 | $y = c - \left(\dfrac{a}{\log x}\right)$ |

In an embodiment, following equation is utilized for obtaining a curve representative of the BLEU scores using the family of curves mentioned in Table 2.

$$\hat{\theta} = \arg\min_\theta \Sigma_{i=1}^n [y_i - F(x_i; \theta)]^2 \quad (3)$$

$\hat{\theta}$: Best curve fit

Thereafter, for each of the family of curves, a root mean square error is calculated based on the efficiency of the SMT system obtained by fitting the family of curves through the BLEU scores and the efficiency of the SMT system obtained by training the SMT system on various configuration of the training set and sample sizes. In an embodiment, the following equation is used for computing the root mean square value (RMSE):

$$RMSE = \frac{1}{N} \sum_{c \in S} \sum_{t \in T_c} \left\{ \frac{1}{n} \sum_{i=1}^n \left[ y_i - F(x_i; \hat{\theta}) \right]^2 \right\}_{ct}^{1/2} \quad (4)$$

Where,
S: Set of training datasets;
$T_c$: Set of test datasets for training configuration c
Similarly, root mean square residual at next point (NPR) and root mean square residual at last point (LPR) is computed using the following equations:

$$NPR = \frac{1}{N} \sum_{c \in S} \sum_{t \in T_c} \left\{ \frac{1}{n-k-1} \sum_{i=1}^n \left[ y_{i+1} - F(x_{i+1}; \hat{\theta}) \right]^2 \right\}_{ct}^{1/2} \quad (5)$$

$$LPR = \frac{1}{N} \sum_{c \in S} \sum_{t \in T_c} \left\{ \frac{1}{n-k-1} \sum_{i=1}^n \left[ y_{i+1} - F(x_{i+1}; \hat{\theta}) \right]^2 \right\}_{ct}^{1/2} \quad (6)$$

The family of curve with the minimum RMSE, NPR and LPR is selected. Further, the curve obtained by fitting the BLEU score and the corresponding configuration using the selected family of curve is considered as the gold curve.

At step 106, a weight vector is computed for each of the first set of anchor points using a regression model based on the first score and a first set of parameters associated with the bi-lingual corpus. In an embodiment, the first set of parameters includes, but is not limited to, length of sentences in the anchor point, lexical diversity in the anchor point, average length of tokens in the anchor point, and word order divergence in the anchor points. A feature vector is computed for each of the first set of parameters corresponding to combination of configurations and the test sets (refer Table 1). In an embodiment, the feature vector corresponds to a mathematical value computed for each of the first set of parameters. Based on the feature vector associated with each of the first set of parameters, the weight vector is computed. In an embodiment, the weight vector is computed using following equation:

$$w_j = \arg\min_w \|\Phi^T w - \mu_j\|^2 + C\|w\|^2 \quad (7)$$

Where,
$w_j$: Weight vector for each of the anchor points;
$\phi$: a matrix of the feature vectors associated with each of the first set of parameters associated with anchor points corresponding to combination of training configuration and test set;
C: Regularization parameter;
j: identifier of the anchor point in the first set of anchor points;
$\mu_j$: first score vector at each of the first set of anchor points; and
w: weight vector over which minimization is done.

At step 108, a second score is computed at each of the first set of anchor points based on the weight vectors at each of the anchor points. Prior to computation of the second score, the SMT system is trained using the bi-lingual corpus. The trained SMT system is used for determining the second score. The trained SMT system utilizes the weight vector assigned to each of the first set of anchor points ($w_j$) and size independent configuration features of the bi-lingual corpus. In an embodiment, following equation is used for determining the second score:

$$\lambda_j = w_j^T \phi \quad (8)$$

Where,
$\lambda_j$: second score at anchor point j for a test data set (t); and
$\phi$: feature vector independent of size of the bi-lingual corpus.

At step 110, a first confidence score is computed for each of the first set of anchor points based on the weight vectors, the first score $\mu_{jct}$ computed at anchor point j for combination ct, and the first set of parameters. In an embodiment, the first confidence score for each of the first set of anchor points is computed using the equation given below:

$$h_j = \left( \frac{1}{N} \sum_{c \in S} \sum_{t \in T_c} (\varphi_{ct}^T w_j^c - \mu_{jct})^2 \right)^{-1} \quad (9)$$

Where,
$h_j$: first confidence score for each of the first set of anchor points;
N: total number of combinations;
$\phi_{ct}$: first set of parameters associated with each of the first set of anchor points;
$w_j$: weights assigned to each of the first set of anchor points;
S: set of training datasets;
Tc: set of test datasets;
c: training configuration; and
t: test corpus.

In an embodiment, the first confidence score hj is deterministic of the efficiency of the SMT system that has been trained using a corpus having a size indicated by the anchor point. For instance, the first confidence score at a first anchor point in the plurality of anchor points is more than the first confidence score at a second anchor point. Then, the confidence in the efficiency of the SMT system trained using a corpus having a size indicated by the first anchor point will be comparatively more than the confidence in the efficiency of the SMT system trained using a corpus having size indicated by the second anchor point.

Post training of the prediction model, the prediction model can be utilized for predicting a learning curve of the SMT system for an unknown corpus having an unknown configuration. In an embodiment, the confidence score at each of the first set of anchor points may be utilized by the prediction model to predict the learning curve. For predicting the learning curve a second set of parameters associated with the learning curve is computed based on the weight vector, the first set of parameters, the first confidence score, and the regression model. The second set of parameters is computed using the equation given below:

$$\theta_u = \arg\min_\theta \Sigma_j h_j (F(s_j; \theta) - \phi_u w_j)^2 \quad (10)$$

Where, $\theta_u$ second set of parameters associated with the learning curve;

$F(s_j; \theta)$: regression model;

$\theta$: variable representing second set of parameters on which minimization is conducted;

$s_j$: anchor size; and u: unseen configuration.

In an embodiment, based on the second set of parameters, the learning curve is fitted based on the first set of anchor points. In an embodiment, the learning curve is indicative of the efficiency of the SMT system corresponding to the anchor point. The evolution of the learning curve from the first set of anchor points is described later in conjunction with FIG. 2.

In an embodiment, the learning curve is displayed to the user, where the user has an option to select the size of the corpus to use for the training the SMT system based on the learning curve.

Figure 2:
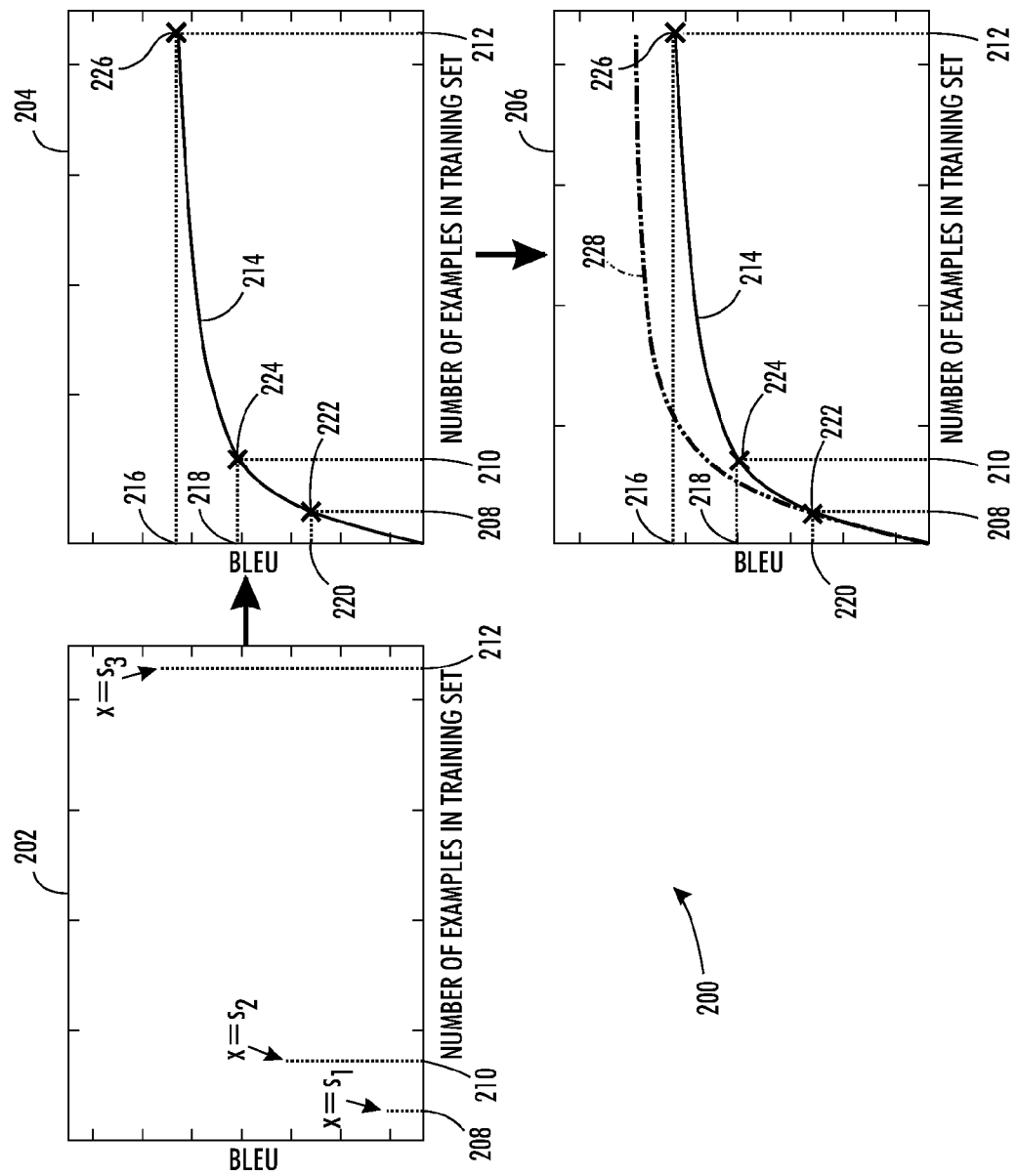
FIG. 2 is a graphical representation illustrating evolution of a learning curve of an SMT system in accordance with at least one embodiment.

FIG. 2 is a graphical representation 200 illustrating the evolution of the learning curve for the SMT system in accordance with at least one embodiment. FIG. 2 will be described in conjunction with the flowchart 100.

The graphical representation 200 includes a graph 202, a graph 204, and a graph 206. The x-axis of the graphs 202, 204, and 206 represents "number of examples of training sets" and the y-axis of the graphs 202, 204 and 206 represents the "BLEU score". The graph 202 illustrates selection of the first set of anchor points. From the graph 202 it can be observed that the first set of anchor points includes three anchor points (depicted by 208, 210, and 212). As shown in graph 206, a gold curve 214 is fitted through the three anchor points (depicted by 208, 210, and 212) to determine the first scores associated with each of the three anchor points (depicted by 220, 218, and 216, respectively). The points on the gold curve 214 corresponding to the three anchor points (depicted by 208, 210, and 212) and the first scores (depicted by 220, 218, and 216) are depicted by 222, 224, and 226. In an embodiment, the fitting of the gold curve is described in step 104.

Based on the first scores associated with each of the three anchor points (depicted by 220, 218, and 216), a weight vector is computed for each of the three anchor points as described in step 106. In an embodiment, a regression model illustrated in equation 7 is used for computing the weight vectors. Based on the weight vector, another model is trained for each of the three anchor points to determine the second score associated with each of the three anchor points (described in step 108). In an embodiment, equation 8 is used for computing the second score for each of the three anchor points.

Based on the second score and the weight vectors associated with the three anchor points, a first confidence score is computed for each three anchor points using equation 9. Based on the first confidence score, the learning curve 228 is predicted as described in step 110 (as shown in graph 206). For instance, the confidence score for the anchor points 208, 210, and 212 corresponds to a confidence of 80%, 50% and 25%, respectively. Thus, the learning curve 228 would pass near the point 222. However, the learning curve 228 would not pass as close to the points 224 and 226.

Figure 3:
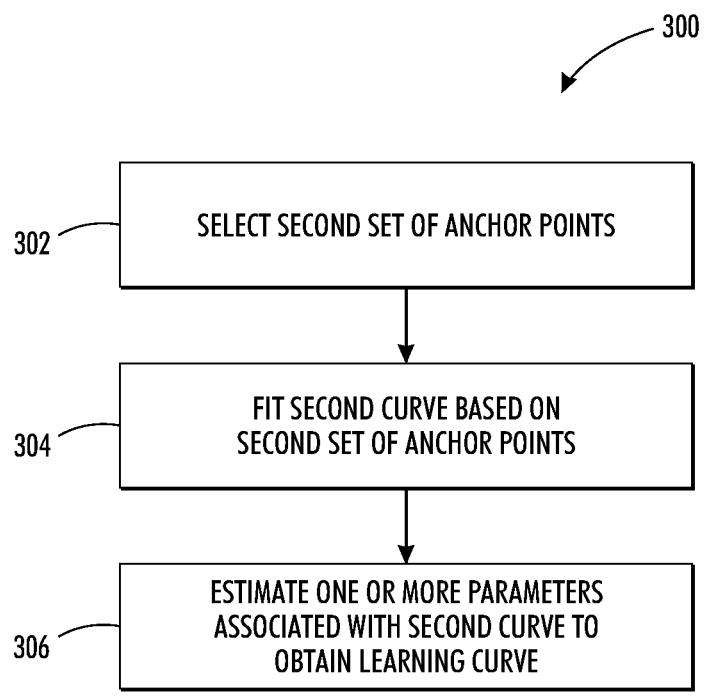
FIG. 3 is a flowchart illustrating a method of estimating a learning curve of an SMT system in accordance with at least one embodiment.

FIG. 3 is a flowchart 300 illustrating a method of estimating a learning curve of an SMT system in accordance with at least one embodiment.

At step 302, a second set of anchor points is randomly selected. In an embodiment, a user selects the second set of anchor points. In an embodiment, each of the second set of anchor points corresponds to a corpus that includes a plurality of bi-lingual segments.

At step 304, a second curve is fitted through each of the second set of anchor points. In an embodiment, the second curve is determined from a family curves as described above in conjunction with the step 104.

At step 306, the one or more parameters associated with the second curve are estimated using at least one of extrapolation or interpolation techniques. In an embodiment, a best fit curve for the first curve is computed using the equation 3. Thereafter, the second curve is extrapolated or interpolated to other anchor points, which were not selected at step 302, to obtain the learning curve for the SMT system. In an embodiment, the learning curve can be used for predicting the efficiency of the SMT system for an unknown corpus having an unknown configuration.

The accuracy of the extrapolated curve may be determined by fitting a first curve or the gold curve based on the second set of anchor points.

Thereafter, a root mean square error is computed based on the first curve and the second curve. In an embodiment, the root mean square error is indicative of a deviation between the second curve and the first curve. In an embodiment, the root mean square value is computed using following equation:

$$RMSE = \left( \frac{1}{N} \sum_{c \in s} \sum_{t \in T_c} (F(s_j; \hat{\eta}_{ct}) - \mu_{ctj})^2 \right)^{1/2} \quad (11)$$

Figure 4:
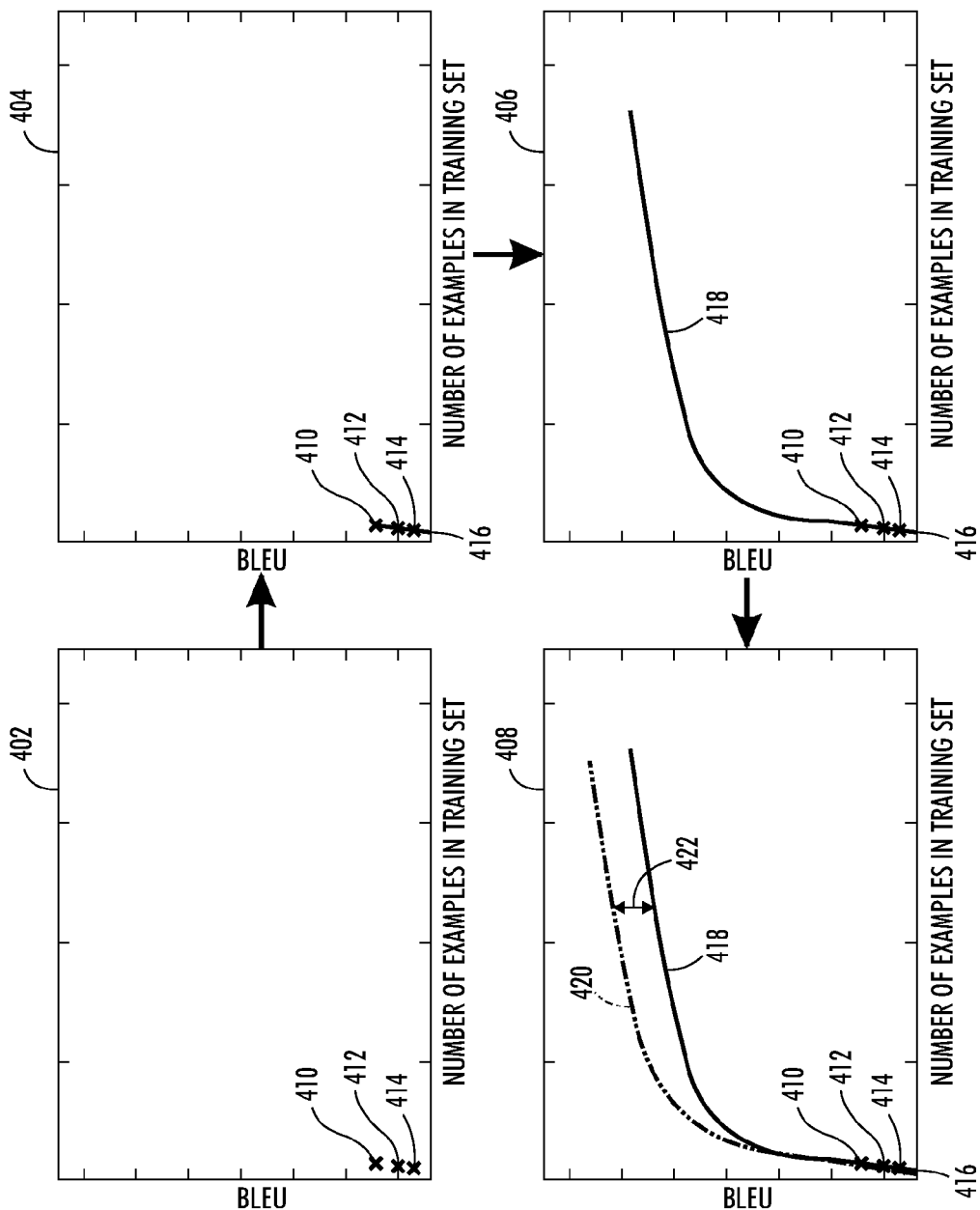
FIG. 4 is a graphical representation illustrating evolution of a learning curve of an SMT system in accordance with at least one embodiment.

FIG. 4 is graphical representation 400 illustrating evolution of a learning curve for the SMT system. The graphical representation 400 is described in conjunction with the flowchart 300.

The graphical representation 400 includes a graph 402, a graph 404, a graph 406 and a graph 408. The x-axis of the graphs 402, 404, 406, and 408 depict "number of examples of training sets" and the y-axis of the graphs 402, 404, 406, and 408 depict the "BLEU score". The graph 402 illustrates selection of the second set of anchor points (depicted by 410, 412, and 414) as described in the step 302. As shown in graph 416, a second curve 416 is fitted to the second set of anchor points (depicted by 410, 412, and 414) as described in step 304. The second curve 416 is extrapolated to obtain the learning curve 418 as shown in the graph 406.

A first curve 420 (i.e., gold curve) is fitted through the second set of anchor points as described in the step 308. Thereafter, a root mean square value is calculated based on a deviation (depicted by 422) between the first curve 420 and the second curve 418.

Figure 5:
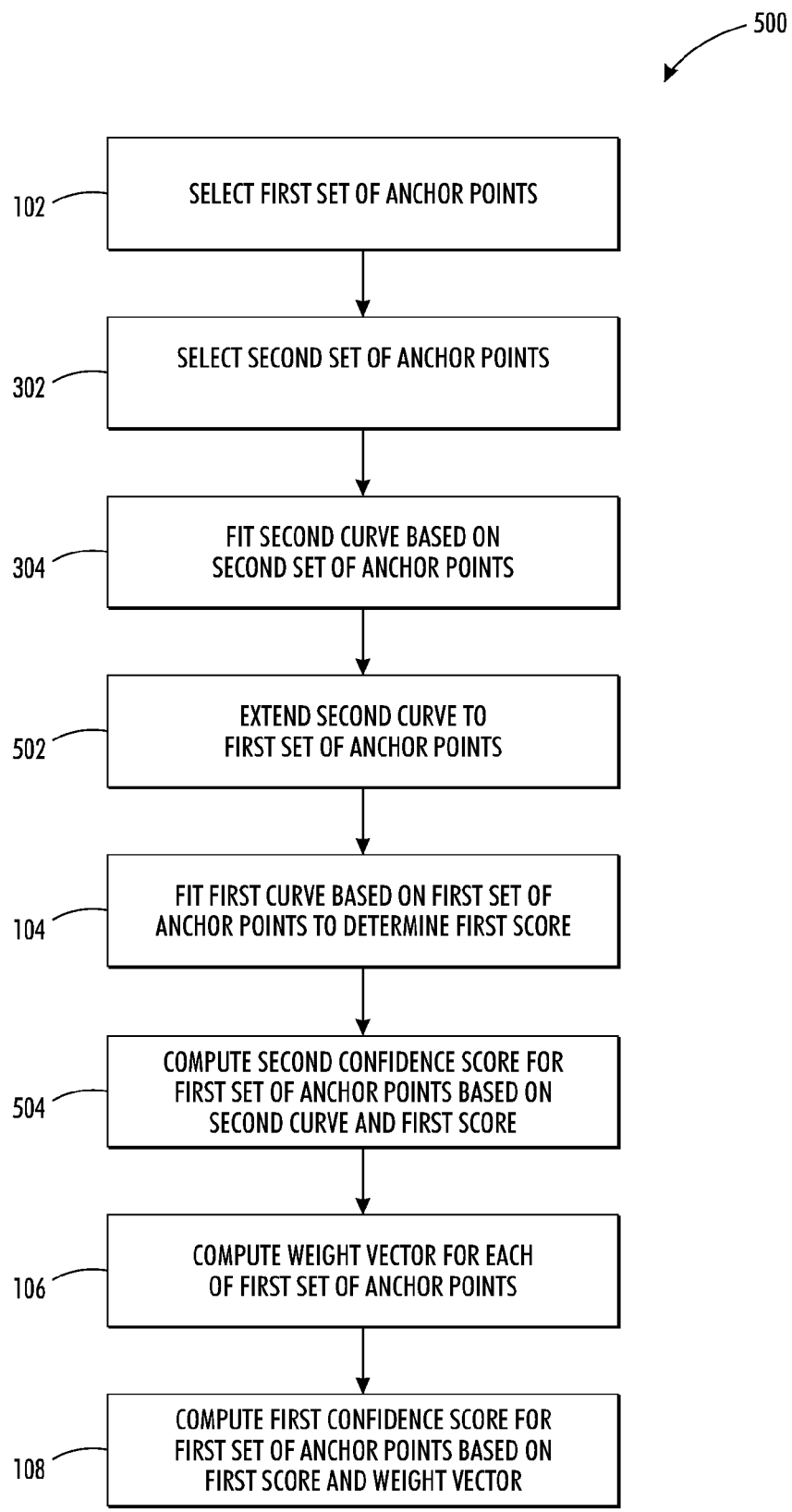
FIG. 5 is a flowchart illustrating yet another method of training a prediction model to estimate a learning curve of an SMT system in accordance with at least one embodiment.

FIG. 5 is flowchart 500 illustrating yet another method of training a prediction model to estimate a learning curve of an SMT system in accordance with at least one embodiment. The flowchart 500 is described in conjunction with FIG. 1 and FIG. 3.

At step 102, the first set of anchor points are selected. At step 302, a second set of anchor points are selected. At step 304, the second curve is fitted through the second set of anchor points.

At step 502, the second curve is extended to the first set of anchor points by estimating the one or more parameters associated with the second curve. In an embodiment, the second curve is extended to the first set of anchor points using at least one of extrapolation or interpolation techniques.

At step 104 a first curve is fitted through the first set of anchor points to determine the first score at each of the first set of anchor points.

At step 504, a second confidence score is computed for each of the first set of anchor points based on the second curve and the first score. In an embodiment, the second confidence score for each of the first set of anchor points is computed using the following equation:

$$\xi_j^{<l} = \left( \frac{1}{N} \sum_{c \in s} \sum_{t \in T_c} (F(s_j; \eta_{ct}^{<l}) - \mu_{ctj})^2 \right)^{-1} \quad (12)$$

Where,
$s_j$: first set of anchor points;
l: largest anchor point;
$\eta_{ct}^{<l}$: parameters associated with the second curve for anchor points less than the largest anchor point l;
ξj: second confidence score; and
μ: first score.

At step 106, the weight vector is computed at each of the first set of anchor points. At step 108, a first confidence score is computed at each of the first set of anchor points based on the weight vector.

Post the training of the prediction model, the prediction model can be utilized for predicting learning curve for an unknown corpus having unknown configuration. In an embodiment, the prediction model utilizes the first confidence score, the second confidence score and the weight vector associated with the first set of anchor points to predict the learning curve. In an embodiment, the second set of parameters is determined using the following equation:

$$\theta_u = \arg\min_\theta \Sigma_j h_j (F(s_j;\theta) - \phi_u^T w_j)^2 + \xi_j^{<l}(F(s_j;\theta) - F(s_j;\widehat{\eta_u}))^2 \quad (13)$$

Where,
$\theta_u$: second set of parameters associated with the learning curve;
$h_j$: first confidence score; and
$\widehat{\eta_u}$: best curve fit for the second curve.

In an embodiment, the second set of parameters includes, but is not limited to, value at an origin, a slope at the origin, and an asymptotic value. The evolution of the learning curve is described in conjunction with FIG. 6.

Figure 6:
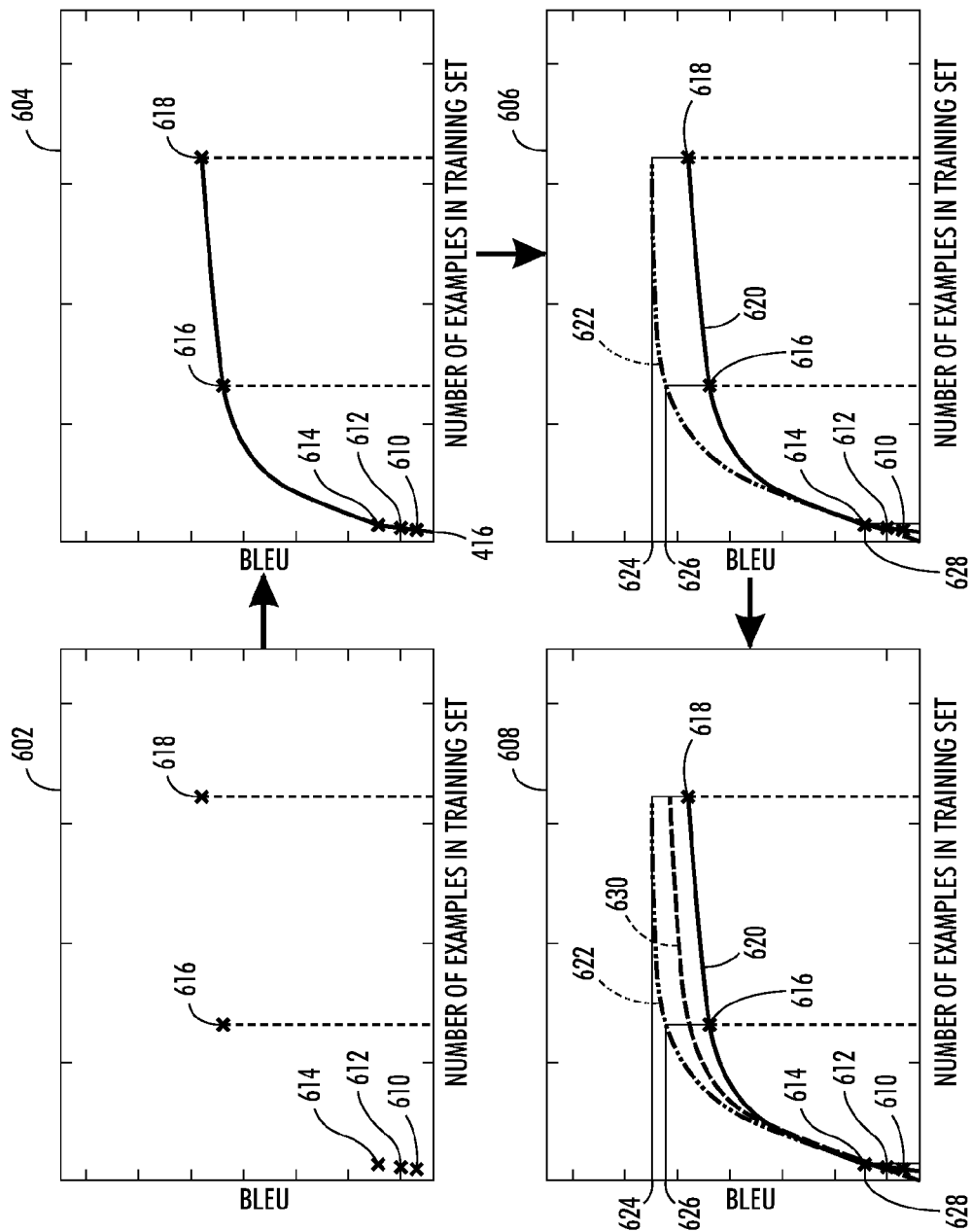
FIG. 6 is a graphical representation illustrating evolution of a learning curve for an SMT system in accordance with at least one embodiment.

FIG. 6 is graphical representation 600 illustrating evolution of learning curve in accordance with at least one embodiment. FIG. 6 is described in conjunction with FIG. 1, FIG. 3, and FIG. 5.

The graphical representation 600 includes a graph 602, a graph 604, a graph 606 and a graph 608. The x-axis of the graphs 602, 604, 606, and 608 depict "number of examples of training sets" and the y-axis of the graphs 602, 604, 606, and 608 depict the "BLEU score". The graph 602 illustrates selection of a first set of anchor points (depicted by 614, 616 and 618) and a second set of anchor points (depicted by 610, 612, and 614) are selected as described in steps 102 and 302. As shown in graph 604, a second curve 620 (refer graph 604) is fitted through the second set of anchor points (depicted by 610, 612, and 614) and then extrapolated to the first set of anchor points (depicted by 614, 616 and 618).

As shown in graph 606, a first curve 622 is fitted through the first set of anchor points (depicted by 614, 616 and 618) as described in step 104. Based on the first curve 622 a first score (depicted by 624, 626, and 628) at each of the first set of anchor points is determined (depicted by 614, 616 and 618). Based on the first score (depicted by 624, 626, and 628) and the second curve 620 a second confidence score at each of the first set of anchor points is computed as described in step 504.

Further, a weight vector is computed at each of the first set of anchor points (depicted by 614, 616 and 618). Based on the second confidence score and the first confidence score a second set of parameters associated with a learning curve is computed. Thereafter, the learning curve 630 is fitted based on the second set of parameters as shown in graph 608. In an embodiment, the learning curve is displayed to the user of the SMT system. The user has an option to select the size of the corpus based on the learning curve to train the SMT system. In an embodiment, the user may select a point where the learning curve begins to saturate. For example, point 630 on the learning curve.

Figure 7:
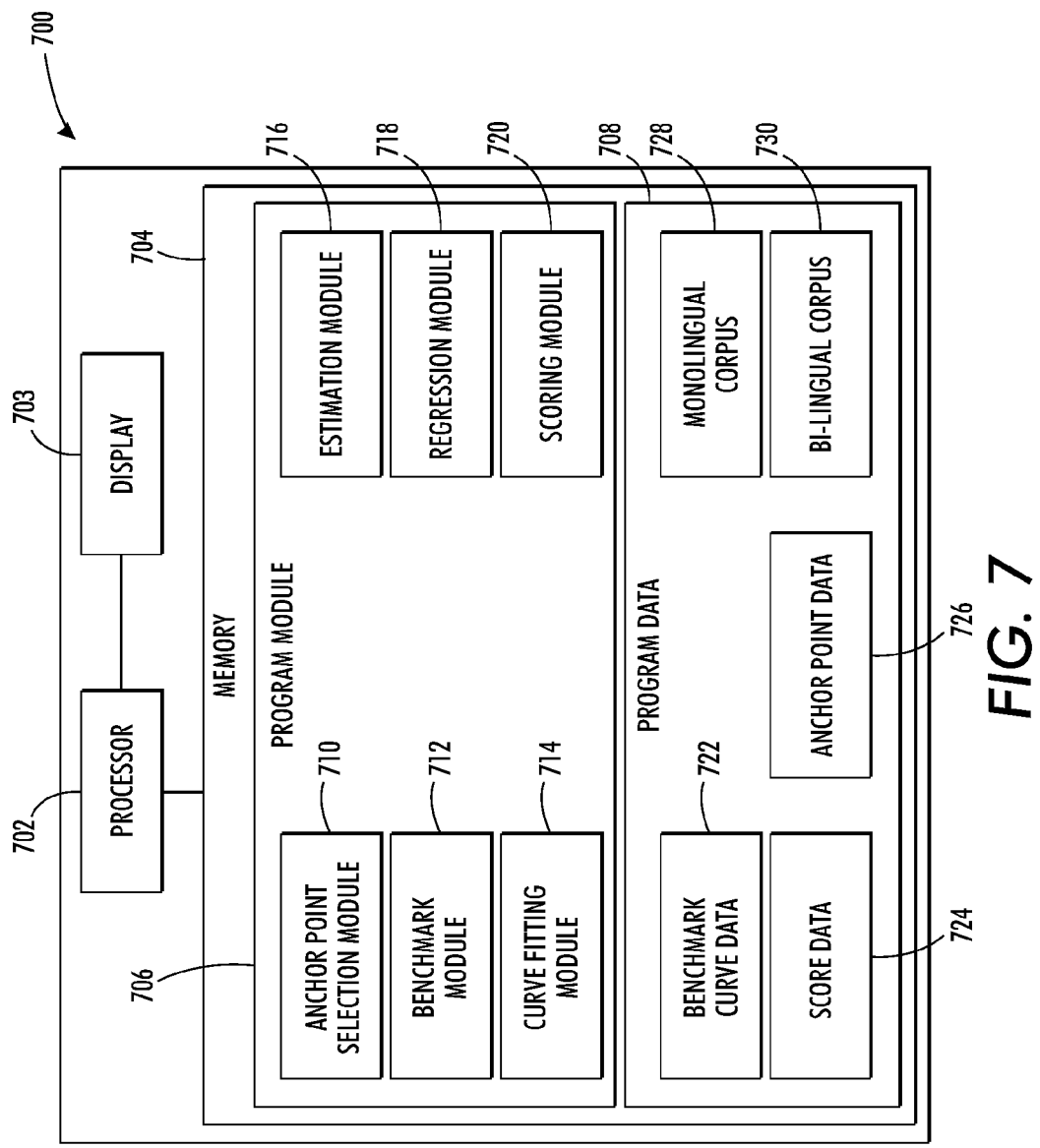
FIG. 7 is a block diagram of an SMT system in accordance with at least one embodiment.

FIG. 7 is a block diagram of a prediction model server 700 in accordance with at least one embodiment. In an embodiment, the prediction model server 700 is utilized for predicting a learning curve for a SMT system. The prediction model server 700 includes a processor 702, a display 703, and a memory 704.

The processor 702 is coupled to the memory 704. The processor 702 executes a set of instructions stored in the memory 704 to perform one or more operations on the prediction model server 700. The processor 702 can be realized through a number of processor technologies known in the art. Examples of the processor 702 can be, but are not limited to, an X86 processor, an RISC processor, an ASIC processor, a CISC processor, ARM processor, or any other processor.

The display 703 displays a learning curve to a user of the prediction model server 700. The display 703 can be realized through several known technologies, such as, Cathode Ray Tube (CRT) based display, Liquid Crystal Display (LCD), Light Emitting Diode (LED)-based display, Organic LED display technology, and Retina Display technology. Further, the display 703 can be a touch screen that receives a user input.

The memory 704 stores a set of instructions and data. Some of the commonly known memory implementations can be, but are not limited to, a random access memory (RAM), a read only memory (ROM), a hard disk drive (HDD), and a secure digital (SD) card. Further, the memory 704 includes a program module 706 and a program data 708. The program module 706 includes a set of instructions that are executable by the processor 702 to perform specific actions on the prediction model server 700. The program module 706 further includes an anchor point selection module 710, a benchmark module 712, a curve-fitting module 714, a scoring module 720, an estimation module 716, and a regression module 718. A person having ordinary skills in the art will know that the set of instructions stored in the memory 704 interact with the hardware of the prediction model server 700 to perform the predetermined operation.

The program data 708 includes a benchmark curve data 722, a score data 724, an anchor point data 726, a monolingual corpus 728, and a bi-lingual corpus 730.

The anchor point selection module 710 randomly selects a first set of anchor points and a second set of anchor points as described in steps 102 and 302. In an alternate embodiment, the anchor point selection module 710 receives an input from a user through the display 703 to select the first set of anchor points and the second set of anchor points. A person having ordinary skill would understand that the scope of the disclosure should not be limited receiving input from the user through the display 703. In an embodiment, the anchor point selection module 710 may receive input through various other techniques such as, but not limited to, mouse, and keyboard. In an embodiment, each of the first set of anchor points includes a plurality of monolingual segments from the monolingual corpus 728. In an embodiment, each of the second set of anchor points includes a plurality of bi-lingual segments from the bi-lingual corpus 730. In an embodiment, the anchor point selection module 710 receives a user input to select the first set of anchor points and the second set of anchor points. Further, the anchor point selection module 710 stores the first set of anchor points and the second set of anchor points as the anchor point data 726.

The benchmark module 712 determines a first curve (i.e., the gold curve) based on one or more experiments executed on the SMT system. The one or more experiments involve training the SMT system using one or more bi-lingual corpus of different sizes and configurations. Thereafter, the benchmark module 712 computes a BLEU score for each of the one or more bi-lingual corpus of different sizes. Based on the BLEU score, the benchmark module 712 determines the first curve. Further, the benchmark module 712 stores the data related to the first curve as the benchmark curve data 722.

The curve-fitting module 714 fits a second curve based on the second set of anchor points as described in step 304. Further, the curve-fitting module 714 extracts the data related to the first curve from the benchmark curve data 722. Thereafter, the curve fitting module 714 fits the first curve based on the first set of anchor points to determine the first score as described in step 104 (refer FIG. 1). The curve-fitting module 714 utilizes one or more curve fitting techniques such as Levenberg-Marquardt technique and non-linear regression to fit the first curve and the second curve.

In an embodiment, the estimation module 716 extends the second curve to the first set of anchor points using at least one of the extrapolation or interpolation techniques as described in step 306. In an embodiment, the estimation module estimates the one or more parameters associated with the second curve to extend the second curve to the first set of anchor points.

The regression module 718 computes the weight vector for each of the first set of anchor points using a regression model based on the first set of parameters associated with the first set of anchor points and the first score (described in step 106). Some examples of the regression model include, but are not limited to, Lasso regression model, Ridge regression model, and the like.

The scoring module 720 computes the first confidence score for each of the first set of anchor points as described in step 108. Further, the scoring module 720 computes the second confidence score based on the first score, the one or more parameters associated with the second curve as described in step 504. Based on the first confidence score and the second confidence score, the curve-fitting module 714 determines the second set of parameters associated with the learning curve as described in step 506.

From the various embodiments, it may be observed that by selecting appropriate anchor points, a learning curve for the SMT system can be predicted. By observing the learning curve, a user of the SMT system may determine the size of corpus that may be required to train the SMT system in order to obtain an efficient SMT system.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for predicting learning curve for statistical machine translation system have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer implemented method of training a prediction model to estimate a learning curve indicative of training of a statistical machine translation (SMT), the computer implemented method comprising:
   selecting a first set of anchor points, wherein each of the first set of anchor points corresponds to a different number of monolingual segments, wherein the first set of anchor points are selectable by a user;
   computing a weight vector for each of the first set of anchor points based, at least in part, on a first set of parameters associated with each of the first set of anchor points, wherein the first set of parameters include average length of a segment, average length of tokens, lexical diversity, word-order divergence; and
   computing a first confidence score for each of the first set of anchor points based on the weight vector.

2. The computer implemented method of claim 1 further comprising computing a second set of parameters associated with the learning curve based, at least in part, on the weight vector and the first confidence score.

3. The computer implemented method of claim 1, wherein the computing of the first confidence score comprises:
   fitting a first curve based on each of the first set of anchor points to determine a first score for each of the first set of anchor points;
   computing the weight vector for each of the first set of anchor points based, at least in part, on a regression model and the first set of parameters, and the first score and
   computing the first confidence score for each of the first set of anchor points based on the weight vector, the first set of parameters, and the first score.

4. The computer implemented method of claim 1, wherein the second set of parameters includes a value at an origin, a slope at the origin, and an asymptotic value.

5. The computer implemented method of claim 1, wherein the first set of anchor points includes at least three anchor points.

6. The computer implemented method of claim 1 further comprising displaying the learning curve to the user.

7. A computer implemented method of estimating a learning curve indicative of training of a statistical machine translation (SMT), the computer implemented method comprising:
   selecting a second set of anchor points, wherein each of the second set of anchor points corresponds to a different number of bi-lingual segments, wherein the second set of anchor points are selectable by a user;
   fitting a second curve based on each of the second set of anchor points; and
   estimating a second set of parameters of the second curve to obtain the learning curve, wherein the second set of parameters include a value at an origin, a slope at the origin, and an asymptotic value.

8. The computer implemented method of claim 7, wherein the estimating corresponds to at least one of extrapolating or interpolating.

9. The computer implemented method of claim 7 further comprising fitting a first curve based on the second set of anchor points.

10. The computer implemented method of claim 9 further comprising computing a root mean square error based on the learning curve and the first curve.

11. The computer implemented method of claim 7 further comprising displaying the learning curve to the user.

12. A computer implemented method of training a prediction model to estimate a learning curve associated with training of a statistical machine translation (SMT), the computer implemented method comprising:
   selecting a first set of anchor points, wherein each of the first set of anchor points corresponds to a different number of monolingual segments, wherein the first set of anchor point are selectable by a user;
   selecting a second set of anchor points, wherein each of the second set of anchor points corresponds to a different number of bi-lingual segments, wherein the second set of anchor point are selectable by the user;
   fitting a second curve based on the second set of anchor points;
   extending the second curve to the first set of anchor points;
   computing a second confidence score for each of the first set of anchor points based, at least in part, on one or more parameters associated with the second curve;

computing a weight vector for each of the first set of anchor points based on a first set of parameters associated with each of the first set of anchor points; and computing a first confidence score for each of the first set of anchor points based on the weight vector.

13. The computer implemented method of claim 12 further comprising computing a second set of parameters associated with the learning curve based, at least in part on, the first confidence score, the second confidence score, and the weight vector.

14. The computer implemented method of claim 12, wherein the computing the first confidence score further comprises:

fitting a first curve based on each of the first set of anchor points to determine a first score for each of the first set of anchor points;

computing the weight vector for each of the first set of anchor points based, at least in part, on a regression model, the first set of parameters, and the first score; and computing the first confidence score for each of the first set of anchor points based on the weight vector, the first set of parameters and the first score.

15. The computer implemented method of claim 14, wherein the first curve corresponds to a benchmark curve.

16. The computer implemented method of claim 12, wherein the first set of parameters include average length of a segment, average length of tokens, lexical diversity, word-order divergence.

17. The computer implemented method of claim 12, wherein the second set of parameters includes a slope, asymptotic value and steady state point.

18. The computer implemented method of claim 12, wherein extending corresponds to at least one of extrapolating or interpolating.

19. The computer implemented method of claim 12 further comprising displaying the learning curve to the user.

20. A prediction model server for estimating a learning curve indicative of training of a SMT, the system comprising:

an anchor point selection module configured to select at least one of a first set of anchor points or a second set of anchor points;

a curve fitting module configured to fit a second curve based on each of the second set of anchor points;

an estimation module configured to extrapolate the second curve to the first set of anchor points;

a scoring module configured to:

compute a second confidence score for each of the first set of anchor points based, at least in part, on one or more parameters associated with the second curve; and compute a weight vector for each of the first set of anchor points based on a first set of parameters associated with each of the first set of anchor points, wherein the first set of parameters include average length of a segment, average length of tokens, lexical diversity, word-order divergence; and wherein, the curve fitting module is further configured to determine a second set of parameters associated with the learning curve based, at least in part, on the second confidence score and the weight vector, wherein the second set of parameters includes a value at an origin, a slope at the origin, and an asymptotic value.

21. The prediction model server of claim 20 further comprising:

a benchmark module configured to generate a first curve to determine a first score for each of the first set of anchor points;

a regression module configured to generate a regression model, wherein the weight vector is assigned to each of the first set of anchor points using the regression model based on the first set of parameters, and the first score; and the scoring module configured to compute a first confidence score based on the weight vector, the first set of parameters and the first score.

22. The prediction model server of claim 21, wherein the second set of parameters is determined based on the first confidence score.

23. The prediction model server of claim 20, wherein each of the first set of anchor points includes a different number of monolingual segments.

24. The prediction model server of claim 20, wherein each of the second set of anchor points includes a different number of bi-lingual segments.

* * * * *